(12) United States Patent
Keltcher et al.

(10) Patent No.: US 12,050,916 B2
(45) Date of Patent: Jul. 30, 2024

(54) ARRAY OF POINTERS PREFETCHING

(71) Applicant: Advanced Micro Devices, Inc., Santa Clara, CA (US)

(72) Inventors: Chetana N Keltcher, Lexington, MA (US); Alok Garg, Maynard, MA (US); Paul S Keltcher, Lexington, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/704,627

(22) Filed: Mar. 25, 2022

(65) Prior Publication Data

US 2023/0305849 A1 Sep. 28, 2023

(51) Int. Cl.
*G06F 9/38* (2018.01)
*G06F 9/30* (2018.01)
(Continued)

(52) U.S. Cl.
CPC ........ *G06F 9/3802* (2013.01); *G06F 9/30043* (2013.01); *G06F 9/3455* (2013.01); *G06F 9/355* (2013.01); *G06F 9/383* (2013.01)

(58) Field of Classification Search
CPC .............. G06F 9/3004; G06F 9/30043; G06F 9/30047; G06F 9/34; G06F 9/345; G06F 9/3455; G06F 9/35; G06F 9/355; G06F 9/3824; G06F 9/383; G06F 9/3832; G06F 12/0862; G06F 2212/602; G06F 2212/6024; G06F 2212/6026; G06F 2212/6028; G06F 9/3016; G06F 9/3813
See application file for complete search history.

(56) References Cited

U.S. PATENT DOCUMENTS 5,822,788 A * 10/1998 Kahn ...................... G06F 9/355
                                                        711/213
5,961,630 A * 10/1999 Zaidi ...................... G06F 9/384
                                                        712/214

(Continued)

FOREIGN PATENT DOCUMENTS

JP      2021524621        9/2021
KR      20200083221 A     7/2020

OTHER PUBLICATIONS

Keltcher, Chetana N, et al., "U.S. Application as Filed", U.S. Appl. No. 17/699,855, filed Mar. 21, 2022, 44 pages.

(Continued)

*Primary Examiner* — Andrew Caldwell
*Assistant Examiner* — Kasim Alli
(74) *Attorney, Agent, or Firm* — FIG. 1 Patents

(57) ABSTRACT

Array of pointers prefetching is described. In accordance with described techniques, a pointer target instruction is detected by identifying that a destination location of a load instruction is used in an address compute for a memory operation and the load instruction is included in a sequence of load instructions having addresses separated by a step size. An instruction for fetching data of a future load instruction is injected in an instruction stream of a processor. The data of the future load instruction is stored in a temporary register. An additional instruction is injected in the instruction stream for prefetching a pointer target based on an address of the memory operation and the data of the future load instruction.

20 Claims, 6 Drawing Sheets

(51) Int. Cl.
*G06F 9/345* (2018.01)
*G06F 9/355* (2018.01)

(56) References Cited

U.S. PATENT DOCUMENTS

| | | | |
|---|---|---|---|
| 6,782,454 B1* | 8/2004 | Damron | G06F 9/30101 |
| | | | 712/237 |
| 10,838,729 B1* | 11/2020 | Al-Otoom | G06F 9/3838 |
| 2003/0126116 A1 | 7/2003 | Chen et al. | |
| 2009/0006808 A1 | 1/2009 | Blumrich et al. | |
| 2009/0198948 A1 | 8/2009 | Arimilli et al. | |
| 2014/0281408 A1* | 9/2014 | Zeng | G06F 9/3834 |
| | | | 712/216 |
| 2014/0372730 A1 | 12/2014 | Qadri et al. | |
| 2016/0011996 A1 | 1/2016 | Asaad et al. | |
| 2017/0123798 A1 | 5/2017 | Friedmann et al. | |
| 2018/0004670 A1* | 1/2018 | Sudhir | G06F 12/0875 |
| 2020/0057644 A1 | 2/2020 | Suzuki et al. | |
| 2021/0049015 A1* | 2/2021 | Chou | G06F 9/30043 |
| 2021/0096861 A1* | 4/2021 | Wang | G06F 9/30047 |
| 2021/0406027 A1 | 12/2021 | Vorbach | |
| 2023/0297381 A1 | 9/2023 | Keltcher et al. | |

OTHER PUBLICATIONS

Sridhar, Akash, et al., "Load Driven Branch Predictor (LDBP)", Cornell University, arXiv Preprint, arXiv.org [retrieved Nov. 3, 2021]. Retrieved from the Internet <https://arxiv.org/pdf/2009.09064.pdf>., Sep. 18, 2020, 12 pages.

PCT/US2023/062499, "International Search Report and Written Opinion", PCT Application No. PCT/US2023/062499, May 25, 2023, 9 pages.

PCT/US2023/062506, "International Search Report and Written Opinion", PCT Application No. PCT/US2023/062506, May 24, 2023, 10 pages.

U.S. Appl. No. 17/699,855, "Non-Final Office Action", U.S. Appl. No. 17/699,855, filed Aug. 31, 2023, 32 pages.

Farooq, M. Umar, et al., "Store-Load-Branch (SLB) Predictor: A Compiler Assisted Branch Prediction for Data Dependent Branches", 2013 IEEE 19th International Symposium on High Performance Computer Architecture (HPCA) [retrieved Sep. 13, 2023]. Retrieved from the Internet <https://doi.org/10.1109/HPCA.2013.6522307>, Feb. 2013, 12 pages.

U.S. Appl. No. 17/699,855, "Final Office Action", U.S. Appl. No. 17/699,855, Apr. 24, 2024, 15 pages.

* cited by examiner

Table 304
- Valid 308
- Program Counter 310
- Stride 312
- Active 314
- Destination Register 316
- Trained 318
- Striding Load Register Number 320

Table 306
- Valid 322
- Program Counter 324
- Use Index Register 328
- Confidence 330
- Other Source Register 332
- Other Source Register Confidence 334
- Striding Load Entry 336
- Cache Status 338
- Cache Miss 340

FIG. 3B

ARRAY OF POINTERS PREFETCHING

BACKGROUND

Data prefetching is a technique in which a load-store unit of a processor leverages a prefetch controller to identify data likely to be requested in the future by an execution unit of the processor based on the history of data requested by the execution unit. The load-store unit prefetches data from a data store (e.g., main memory) at addresses identified by the prefetch controller and causes the prefetched data to be loaded in a cache. The prefetched data is retrievable from the cache faster than the data store.

BRIEF DESCRIPTION OF THE DRAWINGS

The detailed description is described with reference to the accompanying figures.

FIG. 3B illustrates the tables available to the example of the system in one or more implementations in greater detail.

DETAILED DESCRIPTION

Overview

Figure 1:
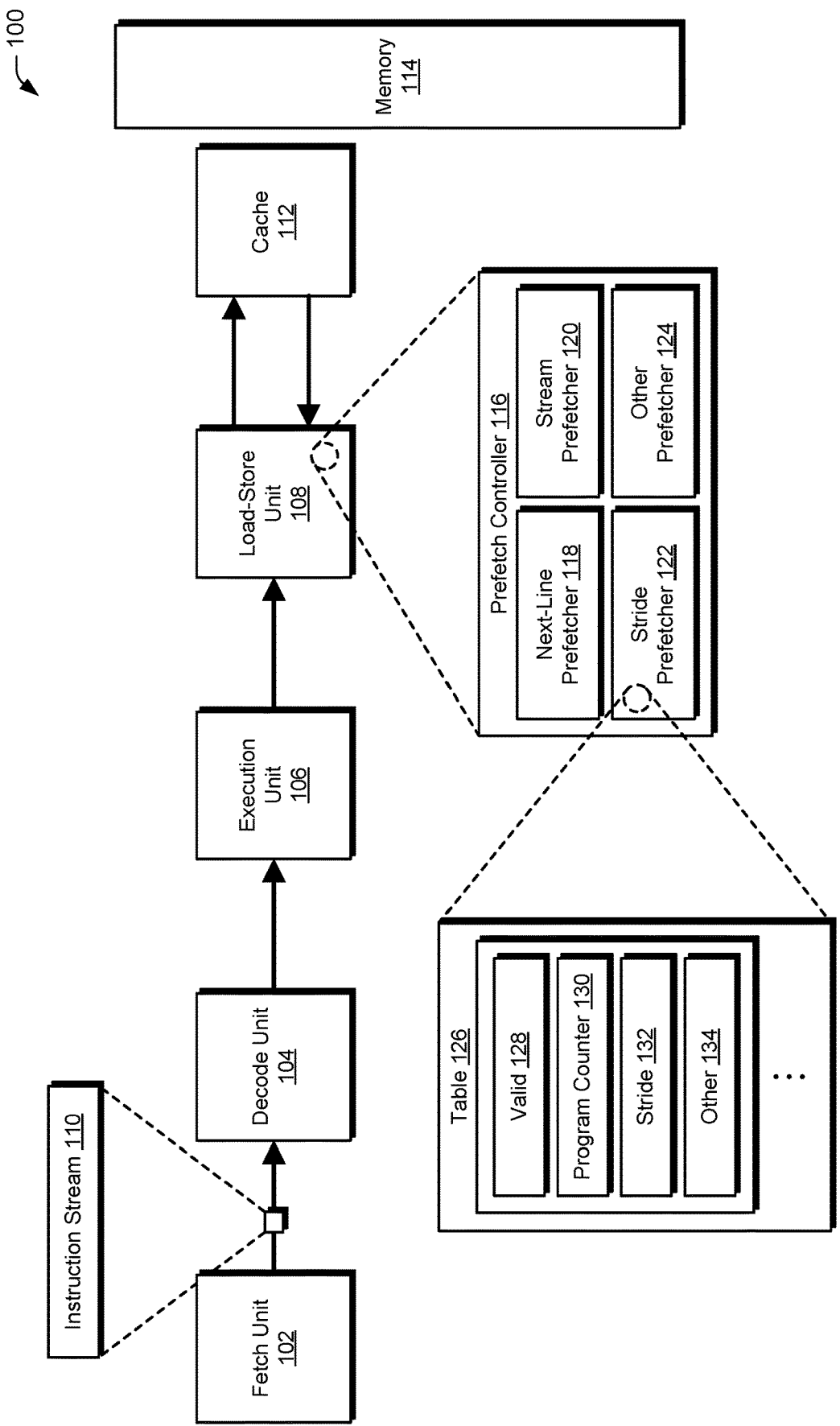
FIG. 1 is a block diagram of a non-limiting example of a system having a prefetch controller for prefetching data likely to be requested by an execution unit of the system in one or more implementations.

Data prefetching refers to techniques which estimate or predict data likely to be requested in the future by an execution unit of a processor based on a history of the data requested by the execution unit. The data that is predicted likely to be requested by the execution unit is prefetched from a data store (e.g., main memory) and loaded into a cache to serve requests for the data from the cache. When the execution unit requests data that is available in the cache (a cache hit), a load-store unit of the processor is capable of quickly providing the requested data from the cache for processing. When the execution unit requests data that is not available in the cache (a cache miss), however, the requested data is retrieved from the data store, which is slower than serving the request from the cache. Accordingly, data prefetching is a technique used to load data into the cache before it is requested and thus improves performance of the processor.

One of the major challenges associated with conventional data prefetching techniques, though, is accurately identifying and retrieving the data that is actually requested by the execution unit, such that the data is loaded into the cache and is accessible before the execution unit requests the data. This is particularly challenging for arrays of pointers which are commonly used in applications such as machine learning, graph analytics, sparse linear algebra, and so forth. One reason that it is challenging to predict which data is likely to be to be requested in connection with arrays of pointers is that an address pointed to (e.g., a pointer) by a particular element of the array may depend on data at an address pointed to by a previous element of the array, and the data at the address pointed to by the previous element can be random and/or can change before the address pointed to by the particular element is requested.

In order to overcome these challenges, a decode unit of a processor is modified to selectively inject at least one instruction into the instruction stream for fetching data of a future load instruction. In one or more implementations, a stride prefetcher of the processor's load-store unit trains the decode unit. For instance, the stride prefetcher trains the decode unit, at least in part, by populating a table that is accessible to the decode unit based on training events. In one example, the stride prefetcher communicates a training event to the table (e.g., via a bus of the processor) in connection with a stride prefetch (e.g., triggered based on an update to the stride prefetcher or when it issues a prefetch request).

In one or more implementations, a training event includes a program counter value, a step size, and a confidence level. By way of example, the program counter value is an instruction address, and the step size is a difference between consecutive memory addresses accessed by instructions having a same program counter value. In one example, the confidence level is based on a number of times that instructions, having the same program counter value, have accessed consecutive memory addresses that are separated by the step size. As discussed in more detail below, in one or more implementations, a training event is used to populate the table based on the confidence level associated with the training event.

Using the populated table, the decode unit monitors load instructions in the instruction stream of the processor and compares program counter values of the load instructions to program counter values of entries included in the table. If a program counter value of a load instruction matches a program counter value of an entry in the table, then a destination location (e.g., a destination register) of the load instruction is captured and the matching entry in the table is updated to include the destination location.

The decode unit monitors address computes of incoming instructions in the decode instruction stream to identify use of the destination location by an incoming instruction. In various scenarios, the destination location is used directly, such as for an index register or a base register of an address compute of an incoming instruction. Alternatively, the destination location is used indirectly, such as when the destination location is used in a separate instruction and a result of the separate instruction is used in an address compute of an incoming instruction.

If the decode unit identifies use of the destination location of the load instruction by an incoming instruction in the instruction stream, then a pointer target instruction is identified. Upon identifying the pointer target instruction, a pointer array prefetcher inserts an instruction, for fetching data of a future load instruction in the decode instruction stream, via an injection bus. In one or more implementations, the inserted instruction includes an address, which is determined by offsetting an address of the load instruction by a product of a step size (from the matched entry in the table) and a number of steps.

The load-store unit receives the inserted instruction and uses the address included in the inserted instruction to fetch the data of the future load instruction. For example, the load-store unit writes the data of the future load instruction to a temporary location (or a register) of the processor that is available to the pointer array prefetcher and/or the decode unit. The pointer array prefetcher then injects an additional instruction in the instruction stream for prefetching a future pointer target. In one or more implementations, this additional instruction includes an address which is an address of the incoming instruction (e.g., a pointer target instruction) with the temporary register (e.g., the data of the future load instruction) used in place of the destination location for address computation.

The load-store unit receives the additional instruction and uses its address to prefetch a pointer target. In accordance with the described techniques, the prefetched pointer target is loaded into a cache before the execution unit requests the future pointer target. Thus, if the execution unit does request the pointer target, then the load-store unit is capable of quickly providing the pointer target from the cache. By prefetching pointer targets in this way, the described techniques produce more cache hits, and the techniques therefore improve performance of the processor relative to conventional techniques for prefetching data.

In some aspects, the techniques described herein relate to a method including: detecting a pointer target instruction by identifying that a destination location of a load instruction is used in an address compute for a memory operation, the load instruction included in a sequence of load instructions having addresses separated by a step size; and injecting an instruction in an instruction stream of a processor for fetching data of a future load instruction using an address of the load instruction offset by a distance based on the step size.

In some aspects, the techniques described herein relate to a method, wherein the pointer target instruction is detected in a decode unit of the instruction stream.

In some aspects, the techniques described herein relate to a method, further including storing the data of the future load instruction in a temporary register or location that is accessible to a decode unit of the processor.

In some aspects, the techniques described herein relate to a method, wherein the memory operation is a load, a load-execute, a store, or a floating point load.

In some aspects, the techniques described herein relate to a method, wherein the distance is a product of the step size and a number of steps.

In some aspects, the techniques described herein relate to a method, wherein the instruction is injected in the instruction stream via an injection bus of the processor.

In some aspects, the techniques described herein relate to a method, further including injecting an additional instruction in the instruction stream for prefetching a pointer target based on an address of the memory operation and the data of the future load instruction.

In some aspects, the techniques described herein relate to a method, further including storing the pointer target in a cache.

In some aspects, the techniques described herein relate to a method, further including tracking a miss rate of a L1 cache.

In some aspects, the techniques described herein relate to a method, wherein an additional pointer target instruction is detected based on the miss rate of the L1 cache.

In some aspects, the techniques described herein relate to a method, wherein an additional pointer target instruction is not detected based on the miss rate of the L1 cache.

In some aspects, the techniques described herein relate to a system including: a decode unit of a processor configured to identify that a destination location of a load instruction is used in an address compute of a memory operation, the load instruction included in a sequence of load instructions having addresses separated by a step size; and a pointer array prefetcher of the processor configured to inject an instruction in an instruction stream of the processor for prefetching data using an address of the memory operation and data of a future load instruction fetched based on the step size.

In some aspects, the techniques described herein relate to a system, wherein the memory operation is a load, a load-execute, a store, or a floating point load.

In some aspects, the techniques described herein relate to a system, wherein the data is stored in a L1 cache, a L2 cache, or a L3 cache.

In some aspects, the techniques described herein relate to a system, wherein the data of the future load instruction is fetched using an address of the load instruction offset by a distance based on the step size.

In some aspects, the techniques described herein relate to a system, wherein the distance is a product of the step size and a number of steps.

In some aspects, the techniques described herein relate to a system, wherein the data of the future load instruction is stored in a temporary register or location that is accessible to the decode unit.

In some aspects, the techniques described herein relate to a method including: identifying that a destination location of a load instruction is used in an address compute of a memory operation, the load instruction included in a sequence of load instructions having addresses separated by a step size; and injecting an instruction in an instruction stream of a processor for prefetching data using an address of the memory operation and data of a future load instruction fetched based on the step size.

In some aspects, the techniques described herein relate to a method, wherein the data of the future load instruction is fetched using an address of the load instruction offset by a distance based on the step size.

In some aspects, the techniques described herein relate to a method, wherein the distance is a product of the step size and a number of steps.

FIG. 1 is a block diagram of a non-limiting example system 100 having a prefetch controller for prefetching data likely to be requested by an execution unit of the system in one or more implementations. In particular, the system 100 includes a fetch unit 102, a decode unit 104, an execution unit 106, and a load-store unit 108 of a processor.

In one or more implementations, a program counter (not shown) of the processor indicates an instruction that is to be processed by the processor as part of an instruction stream 110. By way of example, the fetch unit 102 fetches the instruction indicated by the program counter and the decode unit 104 decodes the fetched instruction for execution by the execution unit 106. In at least one variation, the program counter is incremented, after the instruction is fetched, to indicate a next instruction to be executed as part of the instruction stream 110.

In accordance with the described techniques, the execution unit 106 requests data to execute the instruction. In variations, a cache 112 is initially searched for the requested data. In one or more implementations, the cache 112 is a memory cache, such as a particular level of cache (e.g., L1 cache or L2 cache) where the particular level is included in a hierarchy of multiple cache levels (e.g., L0, L1, L2, L3, and L4). If the requested data is available in the cache 112 (e.g., a cache hit), then the load-store unit 108 is able to quickly provide the requested data from the cache 112. However, if the requested data is not available in the cache 112 (e.g., a cache miss), then the requested data is retrieved from a data store, such as memory 114.

It is to be appreciated that the memory 114 (e.g., random access memory) is one example of a data store from which data may be retrieved when not yet stored in the cache 112 and/or from which data may be loaded into the cache 112, e.g., using the prefetching techniques described above and below. Other examples of a data store include, but are not limited to, an external memory, a higher-level cache (e.g., L2 cache when the cache 112 is an L1 cache), secondary storage (e.g., a mass storage device), and removable media (e.g., flash drives, memory cards, compact discs, and digital video disc), to name just a few. Notably, serving the requested data from the data store when a cache miss occurs is slower than serving the requested data from the cache 112 when a cache hit occurs.

In order to avoid cache misses which increase latency, the load-store unit 108 includes a prefetch controller 116 that identifies patterns in memory addresses accessed as the execution unit 106 executes instructions. The identified patterns are usable to determine memory addresses of the memory 114 that contain data which the execution unit 106 will likely request in the future. The prefetch controller 116 and/or the load-store unit 108 "prefetch" the data from the determined memory addresses of the memory 114 and store the prefetched data in the cache 112, e.g., before the execution unit 106 requests the prefetched data for execution of an instruction of the instruction stream 110 that uses the prefetched data. In accordance with the described techniques, for example, the data requested in connection with executing the instruction, and that is prefetched, corresponds to an array of pointers (e.g., at least one pointer target), an example of which is discussed in more detail in relation to FIG. 2.

The prefetch controller 116 is capable of identifying a variety of different types of patterns in the memory addresses accessed as the execution unit 106 executes instructions included in the instruction stream 110. In the illustrated example, the prefetch controller 116 includes a variety of prefetchers which correspond to examples of those different types of patterns. It is to be appreciated, however, that in one or more implementations, the prefetch controller 116 includes fewer, more, or different prefetchers without departing from the spirit or scope of the described techniques. By way of example, and not limitation, the prefetch controller 116 includes a next-line prefetcher 118, a stream prefetcher 120, a stride prefetcher 122, and an other prefetcher 124.

In one or more implementations, the next-line prefetcher 118 identifies a request for a line of data and prefetches (e.g., communicates a prefetch instruction to the load-store unit 108) a next line of data for loading into the cache 112. The stream prefetcher 120 is capable of prefetching data multiple lines ahead of data requested, such as by identifying a first data access of a stream, determining a direction of the stream based on a second data access of the stream, and then, based on a third data access, confirming that the first, second, and third data accesses are associated with the stream. Based on this, the stream prefetcher 120 begins prefetching data of the stream, e.g., by communicating at least one prefetch instruction to the load-store unit 108.

The stride prefetcher 122 is similar to the stream prefetcher 120, but the stride prefetcher 122 is capable of identifying memory address access patterns which follow a "stride" or a "step size," such as by identifying a pattern in a number of locations in memory between beginnings of locations from which data is accessed. In one or more implementations, a "stride" or "step size" is measured in bytes or in other units.

In one example, the stride prefetcher 122 identifies a location in memory (e.g., a first memory address) of a beginning of a first element associated with an access. In this example, the stride prefetcher 122 determines a direction and the "step size" or "stride" based on a location in memory (e.g., a second memory address) of a beginning of a second element associated with the access, such that the stride or step size corresponds to the number of locations in memory between the beginnings of the first and second elements. Based on further determining that a location in memory (e.g., a third memory address) of a beginning of a third element associated with the access is also the "stride" or "step size" away from the location in memory of the beginning of the second element, the stride prefetcher 122 confirms the pattern, in one or more implementations. The stride prefetcher 122 is then configured to begin prefetching the respective data based on the stride or step size.

In at least one variation, the stride prefetcher 122 stores a program counter value, a stride or step size, and/or other information, examples of which include a confidence level and a virtual address. In the illustrated example, the load-store unit 108 is depicted including, or otherwise having access to, table 126. Further, the table 126 is depicted having an entry with a valid 128 field, a program counter 130 field, a stride 132 field, and an other 134 field. In one or more implementations, the table 126 includes one or more entries that correspond to at least one sequence of instructions processed by the system 100. The inclusion of the ellipses in the illustration represents the capability of the table 126 to maintain more than one entry, in at least one variation. For each entry in the table 126 associated with an instruction sequence, respective values are stored in the table 126's fields, e.g., in the valid 128 field, the program counter 130 field, the stride 132 field, and/or the other 134 field.

In one example, an entry in the table 126 corresponds to a sequence of load and store instructions. In the program counter 130 field, the load-store unit 108 or the prefetch controller 116 stores a program counter value, which in one or more scenarios is an instruction address that is shared by the instructions (e.g., sequential instructions) in the sequence of instructions. In at least one variation, a mere portion of the program counter value is stored in the program counter 130 field of the entry to reduce a number of bits used to store the entry in the table 126, e.g., relative to including an entire program counter value in the field for the entry. In other examples, a program counter hash value is computed from the program counter value (e.g., using a hash function) and is stored in the program counter 130 field to reduce a number of bits used to store the entry in the table 126.

In the stride 132 field, the load-store unit 108 or the prefetch controller 116 stores the determined step size between the locations in memory (e.g., memory addresses) accessed at the beginnings of elements of an array for instructions (e.g., sequential instructions) in the sequence of instructions. In one or more implementations, the table 126 stores other information for an entry in the other 134 field, such as confidence levels, virtual addresses, and various other information. By way of example, the other information includes a number of the memory addresses accessed by the instructions in the sequence of instructions which are separated by the step size indicated in the stride 132 field.

The other prefetcher 124 is representative of additional data prefetching functionality. In one or more variations, for instance, the other prefetcher 124 is capable of correlation prefetching, tag-based correlation prefetching, and/or pre-execution based prefetching, to name just a few. In one or more implementations, the prefetching functionality of the other prefetcher 124 is used to augment or replace functionality of the next-line prefetcher 118, the stream prefetcher 120, and/or the stride prefetcher 122. In the context of prefetching an array of pointers, consider the following example.

Figure 2:
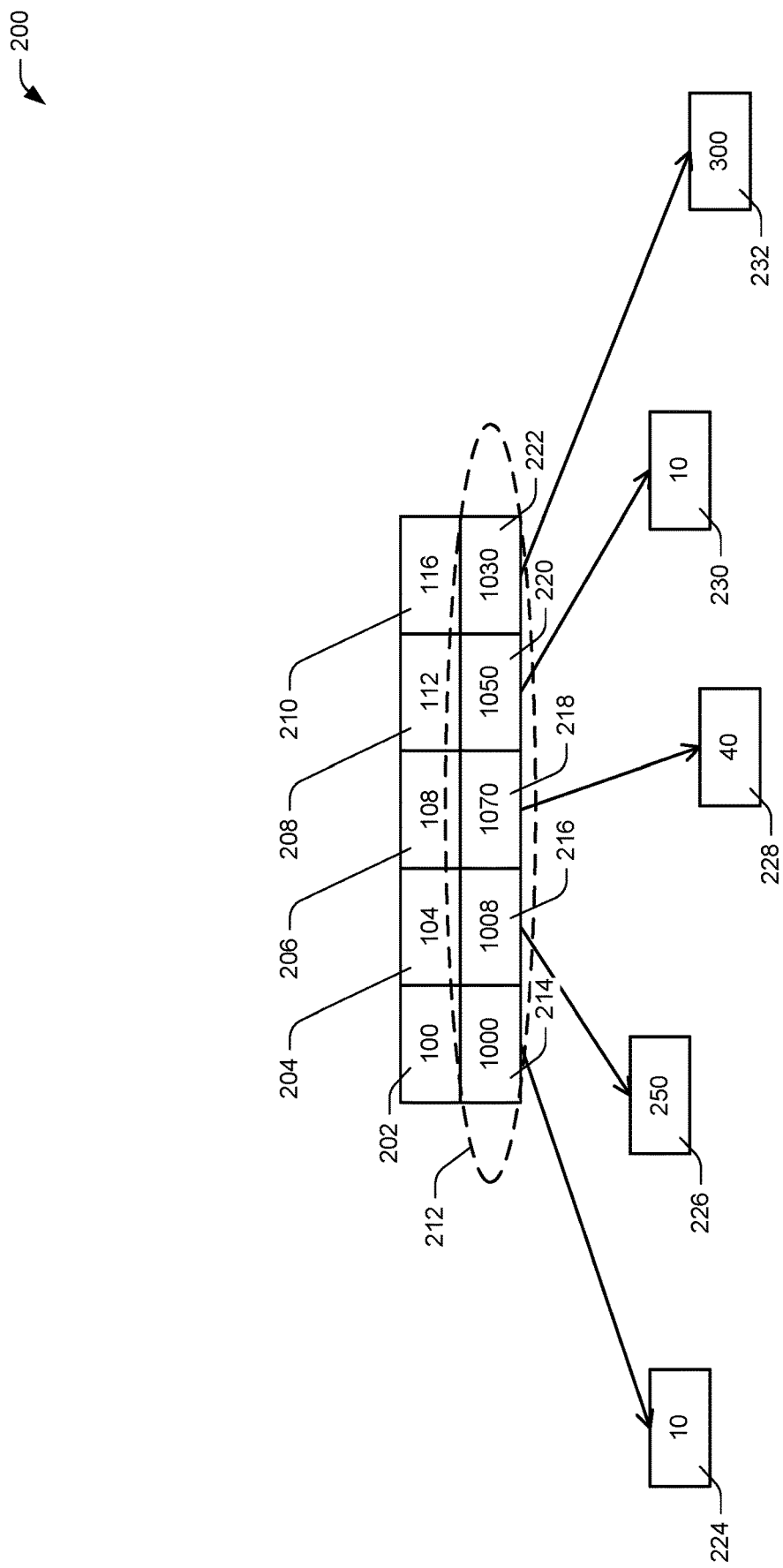
FIG. 2 illustrates a non-limiting example of a representation of an array of pointers.

FIG. 2 illustrates a non-limiting example 200 of a representation of an array of pointers. In this example 200, the representation depicts a first memory address 202, a second memory address 204, a third memory address 206, a fourth memory address 208, and a fifth memory address 210, which correspond to locations in memory of beginnings of elements of array 212. Further, the elements of the array 212 are pointers to locations in memory (e.g., memory addresses) which include data values.

In the example 200, the array 212's elements include a first pointer 214, a second pointer 216, a third pointer 218, a fourth pointer 220, and a fifth pointer 222. As illustrated, the first memory address 202 corresponds to a beginning of a first element of the array 212, which in this example is the first pointer 214. The first pointer 214 further points to address '1000' in memory, which in this example includes data 224 (the value '10'). Also in this example, the second memory address 204 corresponds to a beginning of a second element of the array 212, the second element of the array is the second pointer 216, and the second pointer 216 points to address '1008' in memory, which in this example includes data 226 (the value '250'); the third memory address 206 corresponds to a beginning of a third element of the array 212, the third element of the array is the third pointer 218, and the third pointer 218 points to address '1070' in memory, which in this example includes data 228 (the value '40'); the fourth memory address 208 corresponds to a beginning of a fourth element of the array 212, the fourth element of the array is the fourth pointer 220, and the fourth pointer 220 points to address '1050' in memory, which in this example includes data 230 (the value '10'); and the fifth memory address 210 corresponds to a beginning of a fifth element of the array 212, the fifth element of the array 212 is the fifth pointer 222 and the fifth pointer 222 points to address '1030' in memory, which in this example includes data 232 (the value '300'). It is to be appreciated that the array 212 is merely an example, and that the described techniques operate on arrays of different sizes and that point to different types of data, e.g., strings, floating point values, and various other data structures, without departing from the spirit or scope of the techniques described herein.

In this example 200, a difference between the memory addresses 202-210, which correspond to locations in memory of beginnings of successive elements of the array 212, is four (e.g., four bytes). Thus, in this example 200, the stride or step size of the array 212 is four. Accordingly, the memory addresses 202-210 are predictable using the difference of four. If the array 212 includes a sixth element (not shown), a sixth memory address at which the sixth element (e.g., a sixth pointer) of the array 212 begins is likely equal to the fifth memory address 210 (e.g., '116') plus four (e.g., or '120'). It is to be appreciated that in various systems and depending on various conditions, a difference in memory addresses which correspond to locations in memory of beginnings of successive elements of an array (e.g., of pointers) is different from four without departing from the spirit or scope of the described techniques.

Unlike the memory addresses 202-210 which are predictable using the difference of four, the data 224-232 does not follow such a pattern in the illustrated example, e.g., because the values are random, are not tied to a pattern one to another, depend on dynamic operations, and so forth. As noted above, for example, the data 224 corresponds to the value '10,' the data 226 corresponds to the value '250,' the data 228 corresponds to the value '40,' the data 230 corresponds to the value '10,' and the data 232 corresponds to the value '300.' In the context of prefetching an array of pointers, consider the following example.

Figure 3A:
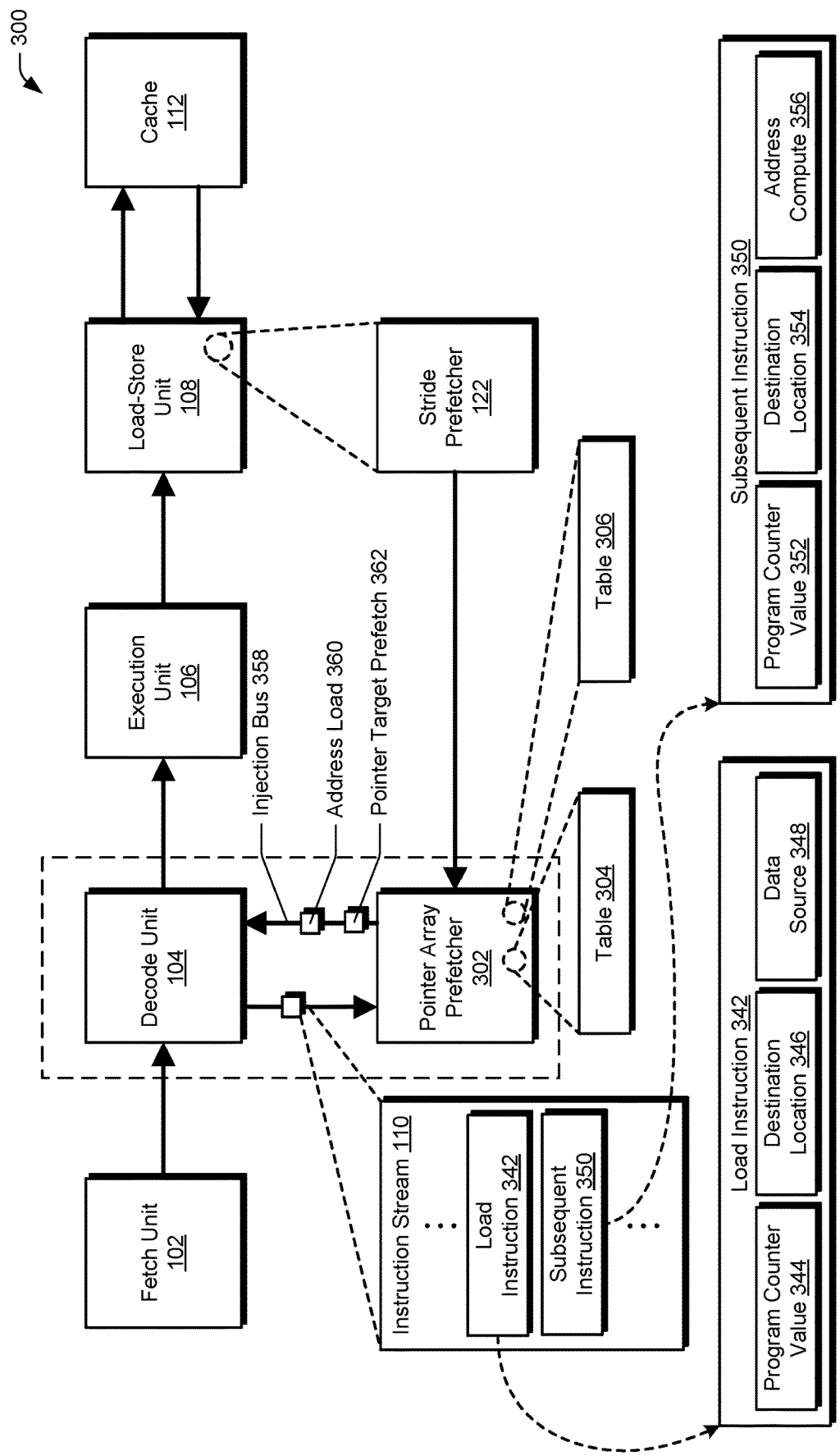
FIG. 3A illustrates the example of the system having a stride prefetcher for prefetching data likely to be requested by an execution unit of the system in one or more implementations.

FIGS. 3A and 3B illustrate a non-limiting example 300 of a system for prefetching an array of pointers.

FIG. 3A illustrates the example 300 of the system having a stride prefetcher for prefetching data likely to be requested by an execution unit of the system in one or more implementations. In particular, the example 300 of the system includes the fetch unit 102, the decode unit 104, the execution unit 106, the load-store unit 108, the cache 112, and the stride prefetcher 122. In one or more implementations, the example 300 system also includes a pointer array prefetcher 302. In this example 300, the pointer array prefetcher 302 includes, or otherwise has access to, table 304 and table 306. Alternatively or in addition, the decode unit 104 includes, or otherwise has access to, the table 304 and the table 306, which are depicted in more detail in FIG. 3B.

FIG. 3B illustrates the tables available to the example 300 of the system in one or more implementations in greater detail. In particular, FIG. 3B depicts the table 304 and table 306 in greater detail. In one or more implementations, the stride prefetcher 122 populates the table 304. In this example, the table 304 includes an entry having a valid 308 field, a program counter 310 field, a stride 312 field, an active 314 field, a destination register 316 field, a trained 318 field, and a striding load register number 320 field. It is to be appreciated that in one or more implementations, the table 304 includes different fields without departing from the spirit or scope of the described techniques. The table 304 is illustrated with ellipses to represent that the table 304 is capable of maintaining a plurality of entries with such fields.

In this example, the table 306 includes a valid 322 field, a program counter 324 field, a use index register 328 field, a confidence 330 field, an other source register 332 field, an other source register confidence 334 field, a striding load entry 336 field, a cache status 338 field, and a cache miss 340 field. It is to be appreciated that in one or more implementations, the table 306 includes different fields without departing from the spirit or scope of the described techniques. The table 306 is illustrated with ellipses to represent that the table 306 is capable of maintaining a plurality of entries with such fields.

In the context of populating the table 304, the stride prefetcher 122 communicates training events (e.g., via a bus of the processor) to the table 304 that include a program counter value, a step size (a stride), and a confidence level each time the stride prefetcher 122 makes a prefetch request. The program counter value is an instruction address and the step size is a difference between consecutive memory addresses accessed by instructions having the same program counter value (e.g., instructions in a loop). The confidence level is a number of times that instructions having the same program counter value access consecutive memory addresses that are separated by the step size.

In order to populate the table 304, the program counter value of each training event is compared with a program counter value stored in the program counter 310 field of each entry in the table 304. A program counter value of a training event either matches a program counter value stored in the program counter 310 field of at least one entry in the table 304 or does not match the program counter value stored in the program counter 310 field of any of the entries in the table 304.

In accordance with the described techniques, the stride prefetcher 122 populates the table based, in part, on a confidence level of the training event. In one example, a training event matches an entry in the table 304 (e.g., when the program counter value of the training event matches the program counter value in an entry's program counter 310 field). If a confidence level of the training event is low (e.g., does not satisfy a threshold confidence level), then the entry is invalidated by setting a value stored in the valid 308 field so that it indicates the entry is invalid. In one or more implementations, the valid 308 field corresponds to a validity bit, and an entry is invalidated by setting the validity bit of the valid 308 field equal to '0.' By way of contrast, an entry is valid in one or more implementations when the validity bit of the valid 308 field equal to '1.' It is to be appreciated that the valid 308 field may indicate validity and invalidity in other ways without departing from the spirit or scope of the described techniques. In a scenario where a training event matches an entry in the table and the confidence level of the training event is high (e.g., satisfies the threshold confidence level), then a step size of the training event is usable to update the stride 312 field of the respective entry, e.g., if the step size of the training event does not match a step size already stored in the stride 312 field of the entry.

In one example, a training event does not match an entry in the table 304, e.g., when the program counter value of the training event does not match the program counter value in any entry's program counter 310 field. In this example, if a confidence level of the training event is low (e.g., does not satisfy the threshold confidence level), then the training event is discarded and the table 304 is not updated based on the training event. Instead, a program counter value of a subsequent training event is compared to the program counter values included in the program counter 310 fields of the table 304's entries.

By way of contrast to the scenario discussed just above, if the confidence level of the non-matching training event is high (e.g., satisfies the threshold confidence level), then a new entry is added to the table 304 and the valid 308 field is set to indicate that new entry is valid, e.g., by setting a validity bit of the new entry's valid 308 field equal to '1'. The new entry in the table 304 is further populated based on the training event. For example, the program counter 310 field of the new entry in the table 304 is updated to store the program counter value of the training event, and the stride 312 field of the new entry in the table 304 is updated to store the step size of the training event.

After the table 304 is populated based on the training events from the stride prefetcher 122, the decode unit 104 further updates the table 304. In accordance with the described techniques, the decode unit 104 updates the table 304 by comparing program counter values of load instructions in the instruction stream 110 to the program counter values included in the program counter 310 field of entries in the table 304, such as by using a content addressable memory so that the comparisons are completed quickly, e.g., in one clock cycle. In one or more implementations, the load instructions for which the values are compared are "younger" instructions, which in at least one example are instructions received after the table 304 is populated with an entry having a matching program counter value.

In this context, the instruction stream 110 is depicted including load instruction 342. In accordance with the described techniques, load instructions are processed to read data from a data store (e.g., memory) and to load (e.g., copy) the data into a destination location (e.g., a destination register) so that the data can be used by the execution unit 106. In the illustrated example 300, the load instruction 342 includes a program counter value 344, a destination location 346, and a data source 348, e.g., where data is loaded from into the specified destination location 346. One example of the data source 348 is a memory address.

When the program counter value 344 of the load instruction 342 matches a value in the program counter 310 field of an entry in the table 304, the decode unit 104 activates the respective entry. For example, the decode unit 104 sets a value in the active 314 field of the matched entry to indicate that the entry is active. In one or more implementations, the active 314 field is configured as a bit, such that setting or leaving the bit at the value '1' indicates that the entry is active and setting or leaving the bit at the value '0' indicates that the entry is inactive. In variations, the active 314 field is configured to indicate activation and inactivation in other ways.

In addition to activating a matched entry, the decode unit 104 updates the destination register 316 field of the matched entry to include the destination location 346 (e.g., the destination register) of the load instruction 342. If a subsequent instruction in the instruction stream 110 is processed that has a program counter value 344 which matches an entry in the table 304, but has a different destination location 346 from the matched entry, then the decode unit 104 causes the destination register 316 field of the matched entry to be overwritten with the different destination location. The decode unit 104 also deactivates the entry, e.g., by updating the active 314 field to indicate that the entry is inactive.

While an entry of the table 304 is activated, the decode unit 104 monitors address computes of incoming load and store instructions (e.g., load instructions, store instructions, load-execute instructions, floating point load instructions, etc.) in the instruction stream 110 and determines whether the monitored address computes use the destination location 346. As used herein, the term "address compute" refers to specification of, or reference to, an equation used to compute an address rather than specification of the actual address, which is not available at decode time in one or more scenarios.

For instance, the decode unit 104 monitors address computes of incoming instructions in the instruction stream 110 for any use (either direct or indirect) of the destination location 346 specified in the load instruction—and maintained in an entry of the table 304. As discussed above and below, the destination location 346 is usable directly in one example, such as for an index or base register of an address compute monitored in association with an incoming instruction. In other examples, the destination location 346 of the load instruction 342 is usable indirectly in a separate instruction such as a load effective address, an add, or a subtract instruction and a monitored address compute of an incoming instruction directly uses a result of the separate instruction.

In one or more implementations, the instruction stream 110 also includes subsequent instruction 350, which includes a respective program counter value 352, a respective destination location 354 (e.g., a destination register), and a respective data source that, in one or more scenarios, corresponds to an address compute 356. By way of example, the address compute 356 of the subsequent instruction 350 uses the destination location 346 of the load instruction 342. Consider, for instance, that in this example the load instruction 342 is represented as "mov P1, [B1+I1*s1+D1]" and the subsequent instruction 350 is represented as "mov P2, [B2+P1*s2+D2]". Here, the destination location 346 of the load instruction 342 is represented as "P1" and the address compute 356 of the subsequent instruction 350 is represented as "[B2+P1*s2+D2]." It is observed that the destination location 346, i.e., "P1", of the load instruction 342 is used in the address compute 356 of the subsequent instruction 350. In part because the destination location 346 of the load instruction 342 is used in the address compute 356 of the subsequent instruction 350, the subsequent instruction 350 is a pointer target instruction. Notably, the destination location 346 is used in this example as the index register in the address compute 356. It is to be appreciated though that the destination location 346 is usable as the base register for an address computation of an instruction in other examples. In one or more implementations, the decode unit 104 detects that the subsequent instruction 350 is a pointer target instruction based on the use of the load instruction 342's destination location 346 in the address compute 356.

Based on the decode unit 104 detecting that the subsequent instruction 350 is a pointer target instruction, the decode unit 104 causes an entry to be added to the table 306 for the instruction. By way of example, the decode unit 104 causes the program counter value 352 to be entered into the program counter 324 field of the entry added to the table 306, and the valid 322 field to be updated to indicate that the entry is validated (e.g., setting a validity bit equal to '1'). In connection with the above example, where the destination location 346 of the load instruction 342 is used as the index register in the address compute 356, the use index register 328 field is updated to indicate that the destination location 346 is used as the index register, e.g., a bit corresponding to the field is set to 'true' or '1'. In an example where the destination location 346 is used as a base register, instead of as an index register, the use index register 328 field is updated to indicate that the destination location 346 is used as a base register—or is not used as an index register. In a scenario where the use index register 328 field corresponds to a bit, then the bit is updateable to 'false' or '0,' which indicates use of the destination location 346 in a pointer target instruction as a base register, rather than as an index register.

Based on adding the entry to the table 306, the load instruction 342 and the subsequent instruction 350, which corresponds to a pointer target instruction, are "paired." In accordance with the described techniques, an identifier (e.g., an index) of the entry in the table 304 which corresponds to the load instruction 342 is used to populate the striding load entry 336 field of the entry for the subsequent instruction 350 in the table 306. In operation, the load instruction 342 is capable of pairing with multiple instructions identified as pointer target instructions because they use the load instruction 342's destination location 346 in respective address computes. It is to be appreciated that in some examples a particular instruction identified as a pointer target instruction is capable of "pairing" with multiple other instructions such as the load instruction 342 and an additional load instruction. Although the instruction stream 110 is depicted with only a single load instruction and a single subsequent instruction, it is to be appreciated that the instruction stream 110 includes multiple load instructions and other types of instructions (e.g., pointer target instructions) in operation.

In one example, the confidence 330 field maintains confidence counts for each entry in the table 306, such that the confidence count corresponding to each entry is maintained by its respective confidence 330 field. It is to be appreciated that in one or more implementations, confidence is measured and indicated in other ways from a count. In at least one implementation where confidence count is used, though, the confidence count of the entry that corresponds to the subsequent instruction 350 is incremented each time an instance of the subsequent instruction 350, identified as a pointer target instruction, is detected between instances of the load instruction 342 and decremented on an absence of a detection. In scenarios where an instruction identified as a pointer target instruction corresponds to an entry in the table 306 and has an additional source register, then the other source register 332 field of the entry is updated to indicate the additional source register and the other source register confidence 334 field is maintained for the entry. For instance, an additional confidence count for the entry corresponding to the subsequent instruction 350 is decremented each time a corresponding source register is overwritten between two of its instances and incremented otherwise.

In one or more implementations, the trained 318 field of entries in the table 304 is based on at least one of the confidence 330 field and the other source register confidence 334 field of corresponding entries in the table 306. For example, the confidence 330 and/or the other source register confidence 334 are compared to a threshold confidence. If the confidence 330 and/or the other source register confidence 334 of the corresponding entries in the table 306 satisfy the confidence threshold, then the trained 318 field of the entry is updated to indicate that the entry is trained.

In the context of the paired load instruction 342 and the subsequent instruction 350, for instance, if the confidence 330 field and/or the other source register confidence 334 field of the subsequent instruction 350's entry in the table 306 satisfy a respective confidence threshold, then the trained 318 field of the load instruction 342's entry in the table 304 is set to indicate that the load instruction 342 is "trained." For example, a bit corresponding to the trained 318 field is set to the value '1'. As a result of being "trained," the load instruction 342 becomes eligible for insertion of instructions into the instruction stream 110 for fetching data of a future load instruction.

Based on this, the pointer array prefetcher 302 and/or the decode unit 104 use a temporary register or striding load register number, e.g., for data storage in connection with fetching data of the future load instructions that corresponds to the load instruction 342. Additionally, the striding load register number 320 field of the load instruction 342's entry is updated with the temporary register or striding load register number. When the temporary register is not being used, it is returned to an integer register pool. This is useful for applications that do not include stride prefetchers because the temporary registers are not reserved when not in use.

In one or more implementations, the pointer array prefetcher 302 inserts instructions for fetching data of a future load instruction via injection bus 358. When the load instruction 342 is eligible for inserting instructions—when the trained 318 field of its corresponding entry in the table 304 indicates that the instruction is trained and when the confidence 330 field of entries in the table 306 that are associated with the load instruction 342 (e.g., via the striding load entry 336 field) satisfy a confidence threshold—then the load instruction 342 is in "insertion mode." While the load instruction 342 is in "insertion mode," the pointer array prefetcher 302 inserts an address load 360 instruction for fetching data of a future load, e.g., data 224-232 pointed to by the pointers 214-222 at the memory addresses 202-210 in the example 200. In particular, the pointer array prefetcher 302 inserts the address load 360 instruction into the instruction stream 110 via the injection bus 358.

In one or more implementations, the address load 360 instruction includes the temporary register number that is maintained in the striding load register number 320 field and an address in the data store (e.g., the memory 114), which is determined based on the data source 348 of the load instruction 342 and the step size indicated in the stride 312 field. For example, the address of the address load 360 instruction is calculated by adding the address indicated in the data source 348 of the load instruction 342 to a product of the step size indicated in the stride 312 field and a number of steps. The number of steps is variable in different implementations. In one or more implementations, for example, the number of steps is a constant number. Alternatively, the number of steps is adjustable, e.g., it starts at a first number and is increased to at least a second, larger number. Alternatively or in addition, the number of steps is constrained in one or more ways. For example, the number of steps is determined as a power of two (e.g., so that the number is produced using a shift operation rather than a multiply operation), the number of steps is based on a type of the cache 112 (e.g., the number of steps is smaller for a lower level cache (L1) than for a higher level cache (L2+)), and so forth. In one or more implementations, the number of steps is tunable, e.g., in code of the program for which the instruction stream 110 is being processed.

Responsive to receiving the address load 360 instruction, the load-store unit 108 fetches the data of the future load instruction from the data store address indicated in the address load 360 instruction and loads the fetched data into at least portion of the temporary register indicated in the address load 360 instruction. The temporary register is available to the decode unit 104 and/or the pointer array prefetcher 302. In one or more implementations, the load-store unit 108 does not train the stride prefetcher 122 based on the inserted address load 360 instruction. In variations, the load-store unit 108 does train the stride prefetcher 122 based on the inserted address load 360 instruction.

In accordance with the described techniques, the pointer array prefetcher 302 inserts an additional instruction in the instruction stream 110 via the injection bus 358. In particular, the pointer array prefetcher 302 inserts a pointer target prefetch 362 instruction for prefetching the target of at least one pointer of the array being prefetched, e.g., an item of the data 224-232 pointed to in the example 200. In one or more implementations, the pointer array prefetcher 302 issues the pointer target prefetch 362 instruction based on (1) detection of a subsequent instruction 350 which corresponds to a pointer target instruction, (2) the pointer target entry being "trained," and (3) the corresponding entry in the table 304 being in insertion mode.

Depending on whether the destination location 346 of the load instruction 342 is used in the subsequent instruction 350 as the base register or as the index register affects a format of the pointer target instruction. For instance, if the destination location 346 of the load instruction 342 is used in the subsequent instruction 350 as the index register, then the temporary register indicated in the striding load register number 320 field replaces the destination location 346 as the index register in the pointer target prefetch 362 instruction. In contrast, if the destination location 346 of the load instruction is used in the subsequent instruction 350 as the base register, then the temporary register indicated in the striding load register number 320 field replaces the destination location 346 as the base register in the pointer target prefetch 362 instruction. After receiving the pointer target prefetch 362 instruction, the load-store unit 108 prefetches the future pointer target, e.g., an item of the data 224-232 pointed to in the example 200. By way of example, the address load 360 instruction causes data 228 to be fetched and the pointer target prefetch 362 instruction causes data 232 to be prefetched. In short, the address load 360 instruction causes the load-store unit 108 to load data from the array (e.g., the pointers 214-222) into temporary registers, and the pointer target prefetch 362 instruction causes the load-store unit 108 to prefetch the future pointer target (e.g., an item of the data 224-232) for loading into the cache 112 (e.g., L1 cache).

In one example, the load-store unit 108 writes the prefetched pointer target to the cache 112 before the execution unit 106 requests the future pointer target. In this way, if the execution unit 106 does request the future pointer target, then the load-store unit 108 is capable of quickly providing the pointer target by accessing the cache 112. This avoids latency which would be incurred if the pointer target is not available in the cache 112 and instead must be loaded, for example, from the data store, e.g., the memory 114. By leveraging the table 304, the table 306, and the pointer array prefetcher 302 in this manner, the described system increases an amount of time that data associated with arrays of pointers is maintained in the cache 112. Thus, when processing an instruction stream that involves an array of pointers, the described system produces more cache hits and therefore improves performance of the processor relative to conventional techniques for prefetching data of arrays of pointers.

In one or more implementations, because inserting instructions in the instruction stream 110 via the injection bus 358 consumes resources of the processor, the pointer array prefetcher 302 does not continuously insert instructions in the injection bus 358 under all conditions. In at least one variation, for instance, a pair of counters is maintained for each entry in the table 306, e.g., using the cache status 338 field and the cache miss 340 field. The counters are updated based on a hit/miss status received from the load-store unit 108, such as relative to the cache 112, which corresponds to an L1 data cache in one or more variations. For example, this tracks a miss rate of the L1 data cache. For instance, the cache-status counter, maintained using the cache status 338 field, is incremented on every status received from the load-store unit 108. Further, the cache-miss counter, maintained using the cache miss 340 field, is incremented on every status received that is a cache miss.

In one or more implementations where the cache status 338 and the cache miss 340 fields are included in entries of the table 306, the cache-status counter is monitored relative to a threshold value. When the cache-status counter satisfies the threshold value, one or more of the cache-status counter and the cache-miss counter counters is divided by two by shifting to the right. In addition or alternatively, an entry in the table 306 is turned off or is detrained based on the counters, e.g., if its cache-status counter is greater than a status number threshold and a miss rate is less than a miss rate threshold. Alternatively or in addition, the two counters are reset periodically, such as after a threshold number of cycles, e.g., every 100,000 cycles.

By using the decode unit 104 to monitor the address computes of incoming load and store instructions in the instruction stream 110 and by inserting prefetch instructions for an array of pointers (e.g., the address load 360 and the pointer target prefetch 362) instructions, the described system compares register numbers of the inserted instructions rather than memory addresses. Because register numbers are generally smaller than memory addresses (e.g., 5-bit versus 64-bit), the hardware required to prefetch arrays of pointers by the described system is reduced relative to conventional techniques for prefetching arrays of pointers. Evaluations of the described techniques demonstrate substantial improvements in processor performance relative to a baseline which does not incorporate the described techniques. Furthermore, the described techniques are implementable using a variety of different types of processors and using different cache levels of a particular processor.

Figure 4:
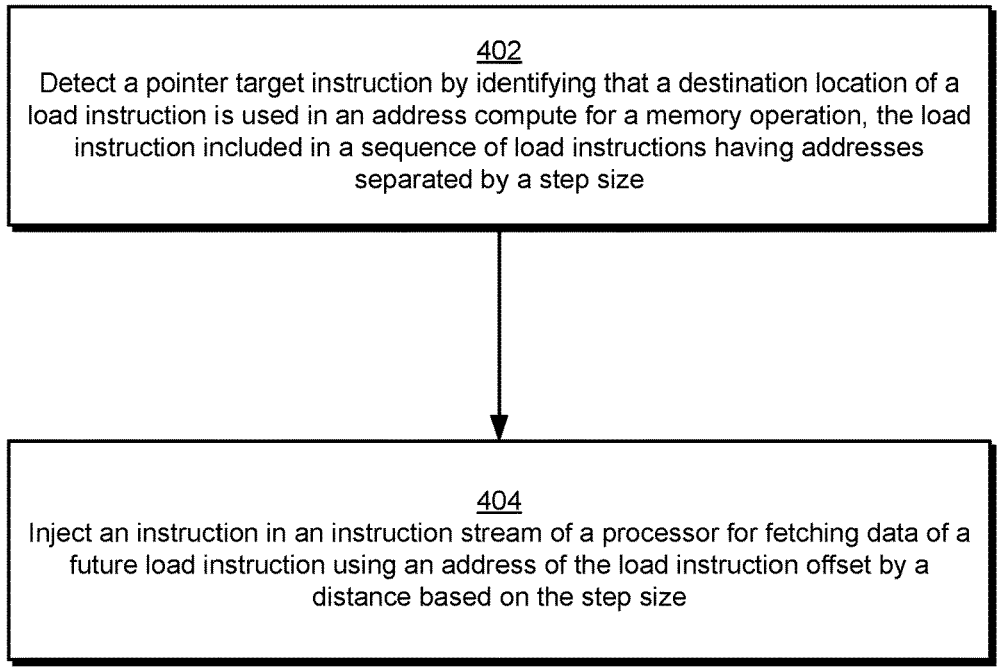
FIG. 4 depicts a procedure in an example implementation of injecting an instruction in an instruction stream for fetching data of a future load instruction.

FIG. 4 depicts a procedure 400 in an example implementation of injecting an instruction in an instruction stream for fetching data of a future load instruction.

A pointer target instruction is detected (block 402). In accordance with the principles discussed herein, the pointer target instruction is detected by identifying that a destination location of a load instruction is used in an address compute for a memory operation. For example, the address compute is a function or an equation that determines an address for the memory operation which is not yet available in a decode instruction stream. The memory operation is a load, a load-execute, a store, a floating point load, etc. For example, the load instruction is included in a sequence of load instructions having a same program counter value and that access consecutive memory addresses separated by a step size. In one example, the destination location of the load instruction is directly used in the address compute for the memory operation such as in a base register or an index register of an address of the memory operation. In another example, the destination location of the load instruction is indirectly used in the address compute for the memory operation such as in an example in which at least a portion of the address computation is performed using a separate instruction and a result of the separate instruction is included in the address compute of the memory operation. For example, the separate instruction is a load effective address instruction, an add instruction, a subtract instruction, and so forth.

An instruction is injected in an instruction stream of a processor for fetching data of a future load instruction using an address of the load instruction offset by a distance based on the step size (block 404). For example, the pointer array prefetcher 302 injects the instruction (e.g., the address load 360 instruction) via the injection bus 358. The load-store unit 108 receives the instruction and fetches the data of the future load instruction, and the load-store unit 108 writes the data of the future load instruction in a temporary register of the processor in one example.

Figure 5:
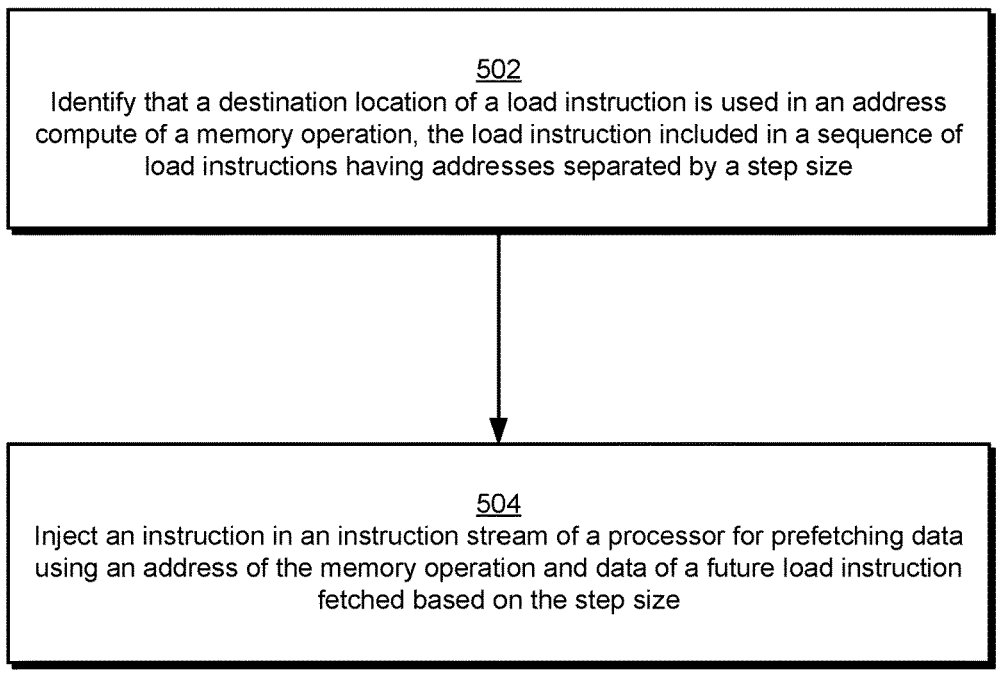
FIG. 5 depicts a procedure in an example implementation of injecting an instruction in an instruction stream of a processor for prefetching data using an address of a memory operation and data of a future load instruction.

FIG. 5 depicts a procedure 500 in an example implementation of injecting an instruction in an instruction stream of a processor for prefetching data using an address of a memory operation and data of a future load instruction.

A use of a destination location of a load instruction in an address compute of a memory operation is identified (block 502). For example, the load instruction is included in a sequence of load instructions having a same program counter value and that access consecutive memory addresses separated by a step size. An instruction is injected in an instruction stream of a processor for prefetching data using an address of the memory operation and data of a future load instruction fetched based on the step size (block 504). In one example, the pointer array prefetcher 302 injects the instruction (e.g., the pointer target prefetch 362 instruction) via the injection bus 358. The load-store unit 108 receives the instruction and prefetches the data (e.g., a pointer target) and writes the prefetched data to the cache 112. Because the prefetched data has been loaded in the cache 112, the load-store unit 108 is capable of quickly providing the prefetched data from the cache 112 responsive to a request for the prefetched data, e.g., a request from the execution unit 106.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the decode unit 104, the execution unit 106, the load-store unit 108, the stride prefetcher 122, and the pointer array prefetcher 302) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), an accelerated processing unit (APU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Conclusion

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
   detecting, by a decode unit of a processor, a pointer target instruction by identifying that a destination location of a load instruction is used in an address compute for a memory operation, wherein the load instruction is included in a sequence of load instructions having addresses separated by a step size, and wherein the decode unit is trained by a stride prefetcher of a load-store unit of the processor to detect pointer target instructions; and
   injecting, by a prefetcher, an instruction into an instruction stream of a processor, wherein the instruction is executable to fetch data of a future load instruction using an address of the load instruction offset by a distance based on the step size.

2. The method of claim 1, further comprising storing the data of the future load instruction in a temporary register or location that is accessible to the decode unit of the processor.

3. The method of claim 1, wherein the memory operation is a load, a load-execute, a store, or a floating point load.

4. The method of claim 1, wherein the distance is a product of the step size and a number of steps.

5. The method of claim 1, wherein the instruction is injected in the instruction stream via an injection bus of the processor.

6. The method of claim 1, further comprising injecting an additional instruction in the instruction stream, the additional instruction being executable to prefetch a pointer target based on an address of the memory operation and the data of the future load instruction.

7. The method of claim 6, further comprising storing the pointer target in a cache.

8. The method of claim 1, further comprising tracking a miss rate of a L1 cache.

9. The method of claim 1, wherein an additional pointer target instruction is identified based on a confidence count maintained in a register associated with the pointer target instruction.

10. The method of claim 1, wherein an additional pointer target instruction is identified based on use of the destination location of the load instruction in an address compute associated with a future load instruction.

11. A system comprising:
a decode unit of a processor configured to detect a pointer target instruction by identifying that a destination location of a load instruction is used in an address compute of a memory operation, wherein the load instruction is included in a sequence of load instructions having addresses separated by a step size, and wherein the decode unit is trained by a stride prefetcher of a load-store unit of the processor to detect pointer target instructions; and
a prefetcher of the processor configured to inject an instruction in an instruction stream of the processor, wherein the instruction is executable to prefetch data using an address of the memory operation and data of a future load instruction, and wherein the data of the future load instruction is fetched based on the step size.

12. The system of claim 11, wherein the memory operation is a load, a load-execute, a store, or a floating point load.

13. The system of claim 11, further comprising at least one cache to store prefetched data.

14. The system of claim 11, wherein the data of the future load instruction is fetched using an address of the load instruction offset by a distance based on the step size.

15. The system of claim 14, wherein the distance is a product of the step size and a number of steps.

16. The system of claim 14, wherein the data of the future load instruction is stored in a temporary register or location that is accessible to the decode unit.

17. A processor comprising:
a decode unit to detect a pointer target instruction by identifying that a destination location of a load instruction is used in an address compute for a memory operation, wherein the load instruction is included in a sequence of load instructions having addresses separated by a step size;
a load-store unit having a stride prefetcher to train the decode unit to detect pointer target instructions; and
a prefetcher to inject an instruction into an instruction stream of the processor, wherein the instruction is executable to fetch data of a future load instruction using an address of the load instruction offset by a distance based on the step size.

18. The processor of claim 17, wherein the memory operation is a load, a load-execute, a store, or a floating point load.

19. The processor of claim 17, further comprising an injection bus and the instruction is injected in the instruction stream via the injection bus.

20. The processor of claim 17, wherein the data of the future load instruction is fetched using an address of the load instruction offset by a distance based on the step size.

* * * * *